United States Patent
Habashi et al.

(10) Patent No.: US 8,353,582 B2
(45) Date of Patent: Jan. 15, 2013

(54) ULTRAVIOLET CURABLE INKJET RECORDING INK AND COLOR IMAGE FORMING APPARATUS

(75) Inventors: Hisashi Habashi, Kanagawa (JP); Michihiko Namba, Kanagawa (JP); Kiyofumi Nagal, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 175 days.

(21) Appl. No.: 13/000,101

(22) PCT Filed: Jun. 30, 2009

(86) PCT No.: PCT/JP2009/062250
§ 371 (c)(1),
(2), (4) Date: Dec. 20, 2010

(87) PCT Pub. No.: WO2010/002021
PCT Pub. Date: Jan. 7, 2010

(65) Prior Publication Data
US 2011/0092610 A1  Apr. 21, 2011

(30) Foreign Application Priority Data
Jul. 1, 2008 (JP) ................................ 2008-172670

(51) Int. Cl.
*C09D 11/00* (2006.01)
*B41J 2/01* (2006.01)
*C08F 2/46* (2006.01)

(52) U.S. Cl. ............ 347/85; 522/75; 522/168; 522/170; 522/173; 522/187; 522/182; 430/280.1; 430/281.1

(58) Field of Classification Search ............. 522/75, 522/168, 173, 170, 182, 187; 526/242, 245, 526/246, 248, 253; 528/59, 369, 401; 523/160; 347/85; 430/280.1, 281.1
See application file for complete search history.

(56) References Cited

U.S. PATENT DOCUMENTS

| 7,682,011 | B2 | 3/2010 | Namba et al. |
| 7,699,457 | B2 | 4/2010 | Namba et al. |
| 7,810,919 | B2 | 10/2010 | Kojima et al. |
| 7,812,068 | B2 | 10/2010 | Habashi et al. |
| 2003/0083396 | A1 | 5/2003 | Ylitalo et al. |
| 2007/0197685 | A1 | 8/2007 | Aruga et al. |
| 2007/0225404 | A1 | 9/2007 | Umebayashi et al. |
| 2008/0070008 | A1 | 3/2008 | Namba et al. |
| 2009/0239044 | A1 | 9/2009 | Habashi et al. |

FOREIGN PATENT DOCUMENTS

| EP | 1 837 381 A1 | 9/2007 |
| JP | 2002 080471 | 3/2002 |
| JP | 2004 51881 | 2/2004 |
| JP | 2004 217813 | 8/2004 |
| JP | 2004 224885 | 8/2004 |
| JP | 3 619 778 | 11/2004 |
| JP | 2006 316243 | 11/2006 |
| JP | 2007 231205 | 9/2007 |
| JP | 2007 323064 | 12/2007 |
| WO | WO 03/010249 A1 | 2/2003 |

OTHER PUBLICATIONS

Extended European Search Report issued Oct. 25, 2011 in patent application No. 09773599.7.
International Search Report issued Sep. 8, 2009 in PCT/JP09/062250 filed Jun. 30, 2009.

*Primary Examiner* — Susan W Berman
(74) *Attorney, Agent, or Firm* — Oblon, Spivak, McClelland, Maier & Neustadt, L.L.P.

(57) ABSTRACT

An ultraviolet curable inkjet recording ink of the present invention includes at least a colorant, a light-curable compound, a photopolymerization initiator, and at least one fluorine surfactant represented by the following formulae (1) or (2) as a surface tension regulator: where Rf is selected from $CH_2CF_3$ and $CH_2CF_2CF_3$; n represents a value of 5 to 20; and each R1 represents a functional group capable of initiating an ultraviolet curing reaction and one of the two R1s in (1) may be hydrogen; where Rf is selected from $CH_2CF_3$ and $CH_2CF_2CF_3$; l represents a value of 1 to 20; k and m each represent a value of 1 to 8; each R2 represents a functional group capable of initiating an ultraviolet curing reaction and one of the two R2s in (2) may be hydrogen; and R3 is selected from hydrogen and methyl.

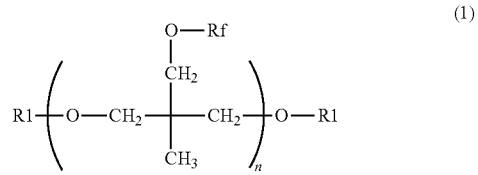

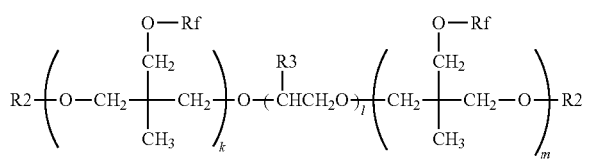

8 Claims, 2 Drawing Sheets

ULTRAVIOLET CURABLE INKJET RECORDING INK AND COLOR IMAGE FORMING APPARATUS

CROSS-REFERENCE TO RELATED APPLICATIONS

This application is a US National Stage Application of PCT/JP2009/062250, filed on Jun. 30, 2009 the text of which is incorporated by reference, and claims priority to Japanese Patent Application 2008-172670, filed on Jul. 1, 2008, the text of which is also incorporated by reference.

TECHNICAL FIELD

The present invention relates to an ultraviolet curable inkjet recording ink and a color image forming apparatus using the same.

BACKGROUND ART

Inkjet printing technology is used in a wide variety of image forming apparatuses for household use and industrial use.

Home-use inkjet printers, which generally use a water-based ink, cannot achieve adequate image quality unless the recording medium used has high ink absorption property. On the other hand, industrial-use inkjet printers, using a solvent with rapid drying property and with high ability to penetrate recording media, perform printing on the types of recording medium on, which images cannot be printed with water-based inks. In the latter case, however, the solvent used evaporates from the water-based ink, which causes problems of bad smell, dangerousness, and toxicity of the solvent. Though inks using less volatile solvents are available, however, the inks dry very slowly, causing problems of poor image quality and poor fixing property. Also available are hot melt inks, which are solid at room temperature, however, these are waxy inks, still causing problems of weak surface strength of fixed images and of wide variations in fixing property of the inks on different types of recording media.

In contrast to these inks, ultraviolet curable inkjet recording inks, which use volatile solvents and smell less, are capable of forming images even on recording media without having ink absorption property and of increasing the process speed of forming images by shortening the fixing time. However, when a recording medium is not sufficiently wet with an ultraviolet curable inkjet ink, the ultraviolet curable inkjet ink does not spread over a surface of the recording medium, resulting in inadequate image quality and in degradation of fixing property due to the reduced contact area between the recording medium and the ink. Furthermore, when the ink layer thickness increases after printing with an ultraviolet curable inkjet ink, the amount of ultraviolet light reaching inside of the deposited ink layer becomes excessively small, causing curing failure of the deposited ink layer.

In order to solve the above problems, an ultraviolet curable inkjet recording ink containing a fluorine surfactant which is capable of remarkably lowering the surface tension of the ultraviolet curable inkjet recording ink has been developed (Patent Literature 1; Patent Literature 2).

However, since such fluorine surfactant does not possess the property of curing on exposure to ultraviolet light, bleeding of such fluorine surfactant takes place from a deposited layer of the ultraviolet curable inkjet recording ink after the deposited layer has been cured.

In order to solve this problem, it is proposed to use fluoroalkyl acrylate or silicone acrylate in ultraviolet curable inkjet recording inks as a wetting enhancer which reacts with ultraviolet light to cure (Patent Literature 3; Patent Literature 4). Although bleeding of such wetting enhancers can be avoided by their ability to react with ultraviolet light to cure, such reactive wetting enhancers are inferior in improving the wettability to surfactants. When such reactive wetting enhancer added into an ultraviolet curable inkjet recording ink is greatly increased in amount to improve the wettability, a considerable amount of the reactive wetting enhancer molecules remain unreacted after the curing reaction, causing bleeding of the unreacted reactive wetting enhancer residue. The amount of the unreacted reactive wetting enhancer residue can be reduced by increasing the amount of a polymerization initiator or irradiated light. However, increasing the amount of the polymerization initiator may adversely influence the physical properties of the coated membrane after curing reaction and increase the toxicity of the ink before curing. Furthermore, in order to increase the amount of irradiated light, it is necessary to provide additional expensive ultraviolet lamps, which is undesirable in terms of cost and electric power consumption.

CITATION LIST

Patent Literature

PTL 1: Japanese Patent Application Laid-Open (JP-A) No. 2004-217813

PTL 2: JP-A No. 2004-224885

PTL 3: Japanese Patent (JP-B) No. 3619778

PTL 4: JP-A No. 2007-323064

SUMMARY OF INVENTION

An object of the present invention is to provide an ultraviolet curable inkjet recording ink which can achieve both improvement of the wettability to a recording medium and avoidance of bleeding of a surfactant component of the ink after curing by ultraviolet light, and an image forming apparatus using the ink.

The means for solving the above problems are represented by the following items <1> to <5>.

<1> An ultraviolet curable inkjet recording ink including at least a colorant, a light-curable compound, a photopolymerization initiator, and a fluorine surfactant represented by one of the following structural formulae (1) and (2) as a surface tension regulator:

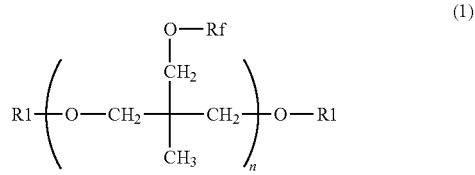

where Rf is selected from $CH_2CF_3$ and $CH_2CF_2CF_3$; n represents a value of 5 to 20; and at least one R1 represents a functional group capable of initiating an ultraviolet curing reaction and one of the two R1s in the structural formula (1) may be a hydrogen atom;

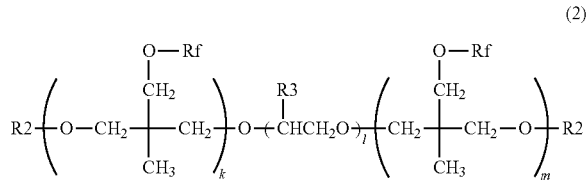

(2)

where Rf is selected from $CH_2CF_3$ and $CH_2CF_2CF_3$; l represents a value of 1 to 20; k and m each represent a value of 1 to 8; at least one R2 represents a functional group capable of initiating an ultraviolet curing reaction and one of the two R2s in the structural formula (2) may be a hydrogen atom; and R3 is selected from a hydrogen atom and a methyl group.

<2> The ultraviolet curable inkjet recording ink according to the item <1>, wherein at least one of the two functional groups R1s has a group selected from a vinyl group, an isopropenyl group, an allyl group, a methallyl group, an acryloyl group, a methacryloyl group, a propioloyl group, a maleoyl group, an epoxy group, and an oxetanyl group.

<3> The ultraviolet curable inkjet recording ink according to the item <2>, wherein at least one of the two functional groups R1 and at least one of the functional groups R2 is represented by the following structural formula (3).

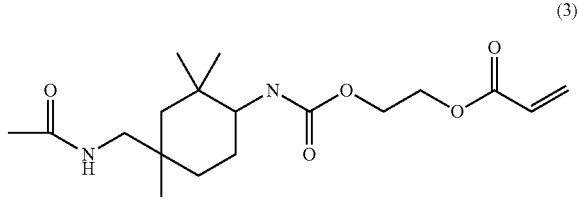 [SMILES: C=CC(=O)OCCOC(=O)NC1CCC(C)(CNC(C)=O)CC1(C)C]

(3)

<4> The ultraviolet curable inkjet recording ink according to the item <2>, wherein at least one of the two functional groups R1 and at least one of the two functional groups R2 is represented by one of the following structural formulae (4) and (5):

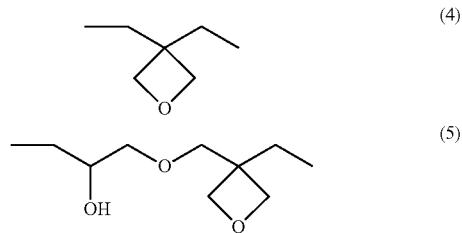

(4)

(5)

<5> A color image forming apparatus, wherein the ultraviolet curable inkjet recording ink according to any one of the items <1> to <4> is used.

According to the present invention, an ultraviolet curable inkjet recording ink which can achieve both improvement of the wettability to a recording medium and avoidance of bleeding of a surfactant component of the ink after curing of the ink on exposure to ultraviolet light, and an image forming apparatus using the ink can be provided.

DESCRIPTION OF EMBODIMENTS

Figure 1:
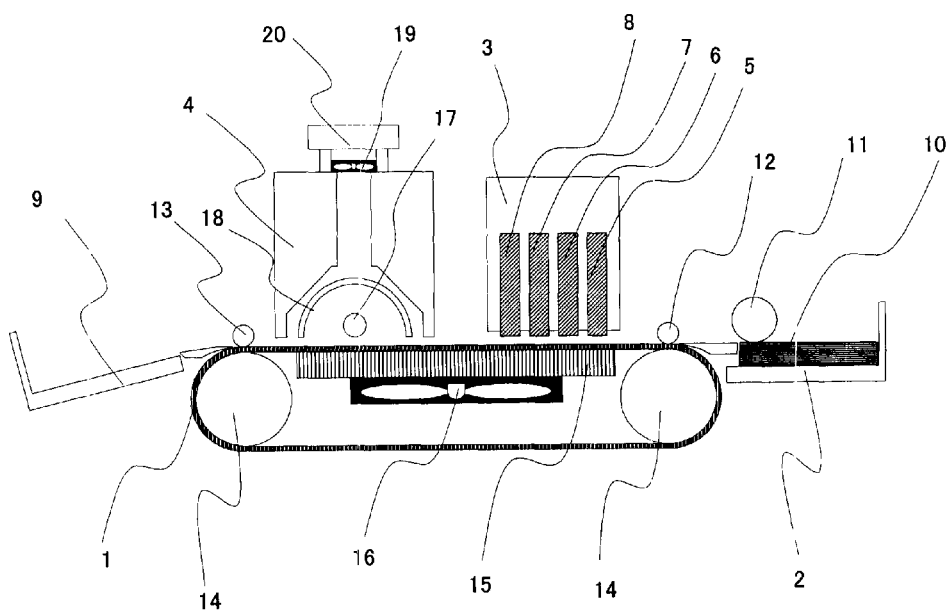
FIG. 1 is a schematic view depicting an example of a line type inkjet recording apparatus.

Hereinafter, the present invention mentioned above is described in detail.

An ultraviolet curable inkjet recording ink according to the present invention contains at least one fluorine surfactant represented by one of the above structural formulae (1) and (2) as a surface tension regulator.

These compounds are characterized in that they contain a polyvalent alcohol with a relatively short fluoroalkyl chain (Rf) as a basic structural unit, have at least an oligomeric part in which one to several tens (as n, k, and m indicate) of the basic structural unit(s) is/are ether-linked, and have a functional group (R1 or R2) capable of initiating an ultraviolet curing reaction. Note that each fluorine surfactant is a mixture of polymer compounds whose number of repeating times of repetitive structural units is different from each other. A value represented by n, k, m, or l is an average value of the number of repeating times of respective repetitive basic structural units.

In general, a fluoroalkyl chain of a fluorine surfactant molecule is hydrophobic and lipophobic, and other part of the fluorine surfactant molecule is solvophilic. As the fluoroalkyl chain selected to be introduced into the fluorine surfactant molecule becomes longer, the hydrophobicity/lipophobicity of the part of the fluorine surfactant molecule is increased which, in combination with solvophilicity of other part of the fluorine surfactant molecule, strengthens the capability of surface activation and may increase thereby the wettability of the ink. When the wettability of an ink is excessively high, however, the ink may excessively wet the orifice part of an inkjet head. Considering the balance of these factors of the fluoroalkyl chain length, a fluoroalkyl group used in a fluorine surfactant of the present invention is one of $CH_2CF_3$ and $CH_2CF_2CF_3$.

When uniform surface state in the vicinity of an orifice part of an inkjet head is not maintained, an ink is ejected in undesirable direction, resulting in abnormal ejection. Consequently the orifice part is treated with a superhydrophobic solvent so as to maintain the uniform surface state. When an ink having very high wettability is used, however, the orifice part is wetted so much that the effect of the hydrophobic solvent treatment is cancelled, leading to irregular wetting state of the surface of the orifice part to cause ejection deviation of the ink.

Though a fluorine surfactant used in the present invention has a shorter fluorine chain than those conventional fluorine surfactants and therefore is inferior in wettability to the conventional fluorine surfactants, the fluorine surfactant used in the present invention is capable of lowering surface tension of an ink much better than silicon surfactants and therefore still has adequate capability for improving the wettability of the ink with a surface of a recording medium. Furthermore, though problems with the ejection quality cannot be overlooked in inks using conventional fluorine surfactants, when the fluorine surfactant of the present invention is used in an ink, the ejection quality of the ink is improved, compared to the ejection quality of the inks using conventional fluorine surfactants.

As to perfluorooctanoic acids (PFOA), there is concern for their bioaccumulative properties and toxicity. Perfluorooctanoic acids differ in biodegradation property depending on the chain length of the perfluoroalkyl group thereof, and it is known that the shorter the chain length of the perfluoroalkyl group is, the more rapid the biodegradation of the perfluorooctanocic acid is. In natural degradation process perfluoroalkylether surfactants are oxidized to be perfluoroalkyl acids via perfluoroalkyl alcohols. Therefore, a natural degradation product of a fluorine surfactant having a long fluoroalkyl chain is highly likely to be bioaccumulated, and thus the use of a fluorine surfactant having a short fluoroalkyl chain is also preferable in terms of safety.

Furthermore, in the present invention an oligomeric surfactant is used, which reduces the amounts of foaming and gas inclusion of ink, reduces the amount of foam introduced into a head, and increases the amount of the ink that can be charged. The mechanism how the use of the oligomeric surfactant reduces the amounts of foaming and gas inclusion of ink is uncertain, however, the mechanism may possibly be explained as follows since a low-molecular-weight surfactant molecule has a high degree of freedom of movement, the fluoroalkyl chains of the low-molecular-weight surfactant molecules freely diffuse to uniformly locate on the interface, reducing the surface tension of the interface entirely. In contrast, fluoroalkyl chains of an oligomeric surfactant molecule are bound in each monomer unit in the oligomeric surfactant molecule, which makes the fluoroalkyl chains of oligomeric surfactant molecules more locally locate on the interface than in the case of fluoroalkyl chains of the low-molecular-weight surfactant, reducing the surface tension of the interface more or less irregularly in the microscopic sense. Since a bubble becomes more stable as the surface tension of its gas-liquid interface becomes lower and more uniform, the difference in uniformity of surface tension between the interfaces activated by the low-molecular-weight surfactants and by the oligomeric surfactants in the microscopic sense is presumed to cause difference in intensity of the foaming and gas inclusion property between these surfactants.

Figure 2:
FIG. 2 is an illustration depicting a typical example of structure of a low-molecular-weight surfactant.

Low-molecular-weight surfactant molecules each contain about one to two polar group(s), which may be the same or different when existing in plurality, and fulfill their function by alignment of their molecule bodies according to the polarity of the interface. However, the low-molecular-weight surfactant molecules do not adequately fulfill their function when they do not align and exist singly. A typical example of structure of a low-molecular-weight surfactant molecule is depicted in FIG. 2.

Figure 3:
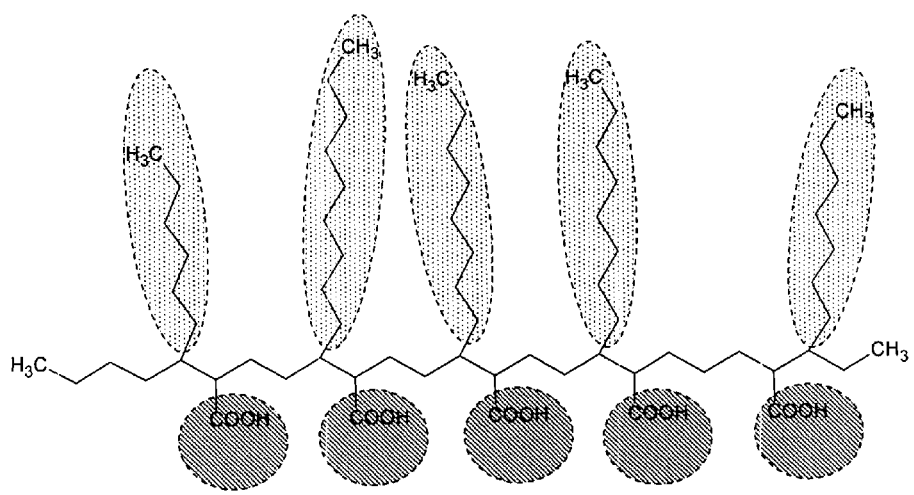
FIG. 3 is an illustration depicting a typical example of structure of a polymeric surfactant.

In contrast, polymeric surfactant molecules, including oligomeric surfactant molecules, each contain a number of polar groups, which may be the same or different, and fulfill their function by alignment of the polar groups in the molecule according to the polarity of the interface. Since the polymeric surfactant molecules are large and indeterminate in shape, it is not necessary for them to be aligned on the interface in a regular manner for fulfilling their function, and even a single molecule thereof can adequately fulfill the function. A typical example of structure of a polymeric surfactant molecule is depicted in FIG. 3.

When a surfactant has a basic structural unit containing a fluoroalkyl group(s) such as represented by one of the above structural formulae (1) and (2), the surfactant may achieve a passable effect. When 'n' of the basic structural unit of fluorine surfactants is less than 5, however, the fluorine surfactants reduce the capability of surface activation so much that they cannot be used. When the 'n' of fluorine surfactants is more than 20, the molecular weight of the fluorine surfactants becomes so large that the moving speed of the fluorine surfactant molecules to an interface is decreased. Consequently, the wetting speed by the inks containing the fluorine surfactants is decreased so much that they cannot adequately fulfill their function as surfactants in inkjet inks and that therefore cannot be used in inkjet inks. Considering these factors, the range of the 'n' is from 5 to 20.

Similarly, when one of 'k' and 'm' is less than 1, the capability of surface activation of fluorine surfactants becomes so low that the fluorine surfactants cannot be used. When one of the 'k' and 'm' is more than 8, the molecular weights of fluorine surfactants become so large that the fluorine surfactants cannot adequately fulfill their function as surfactants and that they cannot be used. Considering these factors, the range of the 'k' or 'm' is from 1 to 8.

'l' may be suitably controlled in accordance with a solvent used in an ink and is typically a value of about 1 to 20.

Note that the average degree of polymerization of a fluorine surfactant in an ink can be measured with LC/MS (Liquid Chromatography/Mass Spectrometry).

Furthermore, when a functional group capable of initiating an ultraviolet curing reaction is introduced into a surfactant component, bleeding of the surfactant component after ink's curing on exposure to ultraviolet light, as well as associated degradation of fixing property and change of physical properties of printed surfaces can be prevented. In multi-color printing, in which different monochrome inks are printed one at a time and each deposited monochrome ink is cured immediately after it has been printed, bleeding of a monochrome ink is caused on an interface with an area of another monochrome ink, leading to changes in density or hue of a printed matter, which results in degradation of stability of the formed images with time.

When an additive which does not react with ultraviolet light to cure and which interacts with a surfactant is contained in an ink, bleeding of the additive is accelerated by the surfactant. When an additive for improving light resistance and plasticity of a coated membrane is used, the bleeding of the additive causes degradation of the light resistance and the plasticity of a coated membrane.

Two systems of ultraviolet curing reaction are generally used, that is, a system of radical polymerization which uses a photoradical initiator, and a system of cationic polymerization which uses a photoacid initiator.

A reactive functional group suitable for a system of radical polymerization is, for example, a functional group having an unsaturated hydrocarbon chain. Preferably, the reactive functional group suitable for a system of radical polymerization is a functional group having a group selected from vinyl group, isopropenyl group, allyl group, methallyl group, acryloyl group, methacryloyl group, propioloyl group, and maleoyl group. More preferably, the reactive functional group suitable for a system of radical polymerization is a group represented by the structural formula (3).

A reactive functional group suitable for a system of cationic polymerization is, for example, a functional group having a vinyl aromatic part, a vinyl ether part, a vinyl amide part, or an oxygen-containing heterocyclic ring. Preferably the reactive functional group suitable for a system of cationic polymerization is a functional group having an epoxy group or an oxetanyl group, and more preferably is, in terms of reactivity, a 3-ethyl-oxetanyl-methyl group represented by the structural formula (4) or a 3-(3-ethyl-oxetanyl-methoxy)-2-hydroxy-propane group represented by the structural formula (5). Including any one of these functional groups in a fluorine surfactant molecule also contributes to improvement of wettability to a recording medium, the balance between the wettability of the ink and the ink-repellency of an orifice part of an inkjet head, and improvement of ink filling property realizable by reducing the amount of foaming.

Examples of a commercially available fluorine surfactant which can be used in the present invention include POLYFOX PF-3305, POLYFOX PF-3510, and POLYFOX PF-3320 (manufactured by OMNOVA SOLUTIONS INC) which each has a group represented by the structural formula (3). A fluorine surfactant which can be used in the present invention may also be synthesized from PF-636, PF-6320, PF-656, or PF-6520 (manufactured by OMNOVA SOLUTIONS INC) which is used as a starting material and provided with an oxetanyl group according to JP-B Nos. 3882486, 3307260, and 4003264 (see compound A mentioned below).

The amount of a fluorine surfactant contained in the ink is desirably 0.01% by mass to 10% by mass. The amount of fluorine surfactant is preferably 0.05% by mass to 10% by mass in terms of providing good wettability of the ink to a recording medium, and is preferably 0.01% by mass to 2% by mass in terms of providing good ejection stability of an inkjet head. When the amount is less than 0.01% by mass, an adequate effect may not be fulfilled in terms of providing good wettability with a recording medium. When the amount is more than 10% by mass, ejection stability is degraded, as well as fixing property of printed images may be degraded. Furthermore, since the fluorine surfactant according to the present invention is inferior in reactivity to a general monomer, an unreacted surfactant residue may be left and quality of printed matter may be degraded with bleeding of the fluorine surfactant residue when the fluorine surfactant is used excessively.

<Ink Physical Property>

An ink according to the present invention preferably has a viscosity of 5 mPa·s to 30 mPa·s, and more preferably has a viscosity of 5 mPa·s to 20 mPa·s at a temperature at the time of ejection. In order to eject an ink having a high viscosity, it is necessary to increase ejection power of an inkjet head. When an ink having a viscosity more than 30 mPa·s is ejected, in an inkjet head using a piezoelectric element, it is necessary to increase the voltage applied between piezoelectric elements, which often causes a problem of leak of electric current, etc. In addition, it is difficult to separate the ink having a high viscosity into independent ink droplets at the time of ink ejection, and resulting in poor shapes of ink droplets often with tails. Thus abnormal p articulation, such as generation of ink mist or separation of satellites, is easy to occur. In contrast, since an ink having a low viscosity often has poor shapes of ink droplets and poor frequency characteristics, the viscosity of the ink having a low viscosity is desirably 5 mPa·s or more for maintaining a high frequency characteristic.

In order to decrease the viscosity of an ink at the time of ejection, a head or an ink supply system may be heated at about 40° C. to 80° C. to decrease the viscosity of the ink for ejection, however, for achieving this it is necessary to heat not only an ink ejection part but also an ink supply system. Control of temperature at the ink ejection part including a head is desirably carried out separately from the ink supply system such that particularly an ink temperature at the ink ejection part is stabilized.

The ink according to the present invention desirably has a surface tension at a temperature of ejection of 20 mN/m to 29 mN/m. More desirably the ink has a surface tension at a temperature of ejection of 23 mN/m to 26 mN/m. When the surface tension at a temperature of ejection is smaller than 20 mN/m, the ejection becomes unstable. When the surface tension is more than 29 mN/m, wettability of an ink with a recording medium becomes inadequate.

It is preferable that an ink exhibiting Newtonian fluid behavior at temperatures at which it is used is used, however, so long as the ink satisfies the above conditions at share speeds at which ordinary measurements were carried out (about 20 rpm to 100 rpm), the ink can be used without problem even when the apparent viscosity of the ink more or less depends on the share speed.

<Ink Constituent Material>

The ink according to the present invention contains a colorant, a light-curable compound, and a photopolymerization initiator, and further contains the fluorine surfactant as a surface tension regulator. Further, it is possible to incorporate in the ink a sensitizer, a photostabilizing agent, a slipping agent, a surface-treating agent, a viscosity reducer, an antioxidant, an antiaging agent, a cross-linking promoter, a polymerization inhibitor, a plasticizer, a preservative, a dispersant, a leveling agent, water, and a solvent, etc.

<Colorant>

The colorant is not particularly limited and can be selected for use in the present invention from, for example, organic pigments or inorganic pigments of the following color index numbers.

For a white pigment, zinc sulfide, titanium dioxide, or C.I. Pigment White 6, etc. can be used.

For a red pigment or a magenta pigment, C.I. Pigment Red 2, 3, 5, 9, 14, 17, 19, 22, 23, 31, 37, 38, 41, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 210, 216, 226, 238, or 257, C.I. Pigment Violet 3, 19, 23, 29, 30, 37, 50, or 88, or C.I. Pigment Orange 5, 13, 16, 20, 34, or 36, etc. can be used.

For a blue pigment or a cyan pigment, C.I. Pigment Blue 1, 15, 15:1, 15:2, 15:3, 15:4, 15:6, 16, 17-1, 22, 27, 28, 29, 36, or 60, etc. can be used.

For a green pigment, C.I. Pigment Green 7, 26, 36, or 50 etc. can be used.

For a yellow pigment, C.I. Pigment Yellow 1, 3, 12, 13, 14, 17, 34, 35, 37, 55, 63, 65, 73, 74, 81, 83, 93, 94, 95, 97, 98, 106, 108, 109, 110, 114, 121, 126, 136, 137, 138, 139, 153, 154, 155, 157, 166, 167, 168, 174, 176, 180, 185, 188, or 193, etc. can be used.

For a black pigment, C.I. Pigment Black 7, 28, or 26, etc. can be used.

The absorbance by an ink of a wave length of ultraviolet light which is required for curing the ink varies depending on the type of a colorant contained in the ink, which results in variations in ultraviolet curing property of an ink depending on the type of a colorant contained in the ink. Consequently, the amount of a colorant is discretionally determined according to the output of an ultraviolet lamp used and the coloring power of the colorant. Usually, the amount added is appropriately one part by mass to 30 parts by mass. When the amount added is less than one part by mass, image quality produced by the ink using the colorant is degraded. When the amount added is more than 30 parts by mass, ultraviolet curing property and ink viscosity property are adversely affected. For adjustment of color, etc. two types or more of the colorants may be appropriately mixed for use.

<Light-Curable Compound>

A light-curable compound which can be used in the present invention accounts for 10% by mass to 70% by mass of the total amount of the ink constituent materials. The light-curable compound that can be used in the present invention is different depending on the type of light curing reaction, that is, whether it is used in a system of radical polymerization using a photoradical initiator or in a system of cationic polymerization using a photoacid initiator.

However, it is also possible to use a mixture of a system of radical polymerization and that of cationic polymerization and to discretionally design a system of light curing reaction according to curing property or adhesion strength and image forming process of a light-curable compound.

(System of Radical Polymerization)

Examples of a light-curable compound of a system of radical polymerization which can be used in the present invention include a compound having an unsaturated hydrocarbon chain as a reactive functional group, and preferably include a compound having a vinyl group, an isopropenyl group, an allyl group, a methallyl group, an acryloyl group, a methacryloyl group, a propioloyl group, and a maleoyl group.

Examples of a light-curable compound having a single functional group include the following: 2-ethylhexyl (meth)acrylate (EHA), 2-hydroxyethyl (meth)acrylate (HEA), 2-hydroxypropyl (meth)acrylate (HPA), caprolactone-modified tetrahydrofurfuryl (meth)acrylate, isobonyl (meth)acrylate, 3-methoxybutyl (meth)acrylate, tetrahydrofurfuryl (meth)acrylate, lauryl (meth)acrylate, 2-phenoxyethyl (meth)acrylate, isodecyl (meth)acrylate, isooctyl (meth)acrylate, tridecyl (meth)acrylate, caprolactone (meth)acrylate, ethoxylated nonylphenol (meth)acrylate, and oxetane (meth)acrylate.

Examples of a light-curable compound having two functional groups include the following: tripropylene glycol di(meth)acrylate, triethylene glycol di(meth)acrylate, tetraethylene glycol di(meth)acrylate, polypropylene glycol di(meth)acrylate, neopentylglycol hydroxyl pivalate di(meth)acrylate (MANDA), hydroxypivalic acid neopentyl glycol ester di(meth)acrylate (HPNDA), 1,3-butanediol di(meth)acrylate (BGDA), 1,4-butanediol di(meth)acrylate (BUDA), 1,6-hexanediol di(meth)acrylate (HDDA), 1,9-nonanediol di(meth)acrylate, diethylene glycol di(meth)acrylate (DEGDA), neopentyl glycol di(meth)acrylate (NPGDA), tripropylene glycol di(meth)acrylate (TPGDA), caprolactone-modified hydroxypivalic acid neopentyl glycol ester di(meth)acrylate, propoxylated pentyl glycol di(meth)acrylate, ethoxy-modified bisphenol A di(meth)acrylate, polyethylene glycol 200 di(meth)acrylate, and polyethylene glycol 400 di(meth)acrylate.

Examples of a light-curable compound having a plurality of functional groups include the following: trimethylolpropane tri(meth)acrylate (TMPTA), pentaerythritol tri(meth)acrylate (PETA), dipentaerythritol hexa(meth)acrylate (DPHA), triallyl isocyanate, a (meth)acrylate of ε-caprolactone-modified dipentaerythritol, tris(2-hydroxyethyl)isocyanurate tri(meth)acrylate, ethoxylated trimethylolpropane tri(meth)acrylate, propoxylated trimethyloipropane tri(meth)acrylate, propoxylated glyceryl tri(meth)acrylate, pentaerythritol tetra(meth)acrylate, ditrimethylolpropane tetra(meth)acrylate, dipentaerythritol hydroxypenta(meth)acrylate, ethoxylated pentaerythritol tetra(meth)acrylate, and one of penta(meth)acrylate esters.

Examples of an oligomeric light-curable compound include polyester resins, acrylic resins, epoxy resins, urethane resins, alkyd resins, ether resins, acrylates of polyvalent alcohol, etc., and methacrylate.

Examples of the polymeric light-curable compound include water-soluble resins having a polymerizable functional group and photocurable resins of emulsion type.

These light-curable compounds of systems of radical polymerization can be used alone or as a mixture of two or more types.

Examples of a photopolymerization initiator of a system of radical polymerization include one of benzoin ethers, acetophenones, benzophenones, thioxanthones, and particular groups, such as acylphosphineoxides and methylphenylglyoxylates, and include a benzoin alkyl ether, benzyl methyl ketal, hydroxychlorohexylphenylketone, p-isopropyl-α-hydroxyisobutylphenone, 1,1-dichloroacetophenone, and 2-chlorothioxanthone. These may be used alone or as a mixture of two or more types.

The amount of the above-mentioned photopolymerization initiator is one percent by mass to 10% by mass of the total amount of the vehicle.

Examples of an auxiliary agent for the above-mentioned photopolymerization initiator include triethanolamine, ethyl 2-dimethylaminobenzoate, isoamyl 4-dimethylaminobenzoate, and a polymeric tertiary amine. Also a type of light curing resin which contains a photopolymerization initiator may be used.

(System of Cationic Polymerization)

A light-curable compound of a system of cationic polymerization which can be used in the present invention is principally, for example, one of vinyl aromatic compounds, vinyl ethers, N-vinyl amides, compounds having an epoxy group, and compounds having an oxetanyl group.

Examples of the vinyl aromatic compound include the following: styrene, p-methylstyrene, p-methoxystyrene, β-methylstyrene, p-methyl-β-methylstyrene, α-methylstyrene, p-methoxy-β-methylstyrene, 1-vinylnaphthalene, α-methyl-1-vinylnaphthalene, β-methyl-1-vinylnaphthalene, 4-methyl-1-vinylnaphthalene, and 4-methoxy-1-vinylnaphthalene.

Examples of the vinyl ether include the following: isobutyl vinyl ether, ethyl vinyl ether, phenyl vinyl ether, p-methylphenyl vinyl ether, p-methoxyphenyl vinyl ether, α-methylphenyl vinyl ether, β-methylisobutyl vinyl ether, β-chloroisobutyl vinyl ether, ethyleneglycol divinyl ether, 2-chloroethyl vinyl ether, 2-hydroxyethyl vinyl ether, triethyleneglycol divinyl ether, 1,4-cyclohexanedimethanol divinyl ether, hydroxybutyl vinyl ether, and a propenyl ether of propylene glycol.

Examples of the N-vinyl amide include the following N-vinylcarbazole, N-vinylpyrrolidone, N-vinylindole, N-vinylpyrole, N-vinylphenothiazine, N-vinylacetoanilide, N-vinylethylacetoamide, N-vinylsuccinimide, N-vinylphthalimide, N-vinylcaprolactam, and N-vinylimidazole.

Examples of the compound having an epoxy group include the following: hydrogenated bisphenol A diglycidyl ether; 3,4-epoxycyclohexylmethyl-3,4-epoxycyclohexanecarboxylate; 3,4-epoxy-1-methylcyclohexyl-3,4-epoxy-1-methylhexanecarboxylate; 6-methyl-3,4-epoxycyclohexylmethyl-6-methyl-3,4-epoxycyclohexanecarboxylate; 3,4-epoxy-3-methylcyclohexylmethyl-3,4-epoxy-3-methylcyclohexanecarboxylate; 3,4-epoxy-5-methylcyclohexylmethyl 3,4-epoxy-5-methylcyclohexanecarboxylate; 2-(3,4-epoxychclohexyl-5,5-spiro-3,4-epoxy)cyclohexane-metadioxane; bis(3,4-epoxycyclohexylmethyl)adipate; 3,4-epoxy-6-methylcyclohexylcarboxylate; methylene his (3,4-epoxycyclohexane); dicyclopentadienediepoxide; ethylene his (3,4-epoxycyclohexanecarboxylate); dioctyl epoxyhexahydrophthalate; di-2-ethylhexyl epoxyhexahydrophthalate; 1-epoxyethyl-3,4-epoxycyclohexane; 1,2-epoxy-4-epoxyethylcyclohexane; 3,4-epoxycyclohexylmethylacrylate; 3,4-epoxycyclohexylmethylmethacrylate; 1,4-butanediol diglycidyl ether; 1,6-hexanediol diglycidyl ether; a glycidyl ether of a polyvalent alcohol, such as a triglycidyl ether of glycerin, a triglycidyl ether of trimethylolpropane, a tetraglycidyl ether of sorbitol, a hexaglycidyl ether of dipentaerythritol, a diglycidyl ether of a polyethylene glycol, and a diglycidyl ether of a polypropylene glycol; a ployglycidyl ether of a polyetherpolyol obtained by subjecting an aliphatic polyvalent alcohol, such as propylene glycol, trimethylolpropane, and glycerin to an addition reaction with one or more alkylene oxide(s); and a diglycidyl ester of an aliphatic long chain dibasic acid.

Further, examples of the compound having an epoxy group include a monoglycidyl ether of an aliphatic higher alcohol; a monoglycidyl ether of phenol, cresol, butylphenol, and a polyether alcohol obtained by subjecting phenol, cresol, and butylphenol to an addition reaction with an alkylene oxide; a glycidyl ester of a higher fatty acid; epoxidized soybean oil; octyl epoxystearate; butyl epoxystearate; and an epoxidized polybutadiene.

Examples of the compound having an oxetanyl group include the following: 3-ethyl-3-hydroxymethyloxetane, 3-(meth)allyloxymethyl-3-ethyloxetane, (3-ethyl-3-oxetanylmethoxy)methyl benzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl (3-ethyl-3-oxetanylmethyl)ether, isobonyloxyethyl (3-ethyl-3-oxetanylmethyl)ether, isobonyl (3-ethyl-3-oxetanylmethyl)ether, 2-ethylhexyl (3-ethyl-3-oxetanylmethyl)ether, ethyldiethyleneglycol (3-ethyl-3-oxetanylmethyl)ether, dicyclopentadiene (3-ethyl-3-oxetanylmethyl)ether, dicyclopentenyloxyethyl (3-ethyl-3-oxetanylmethyl)ether, dicyclopentenyl (3-ethyl-3-oxetanylmethyl)ether, tetrahydrofurfuryl (3-ethyl-3-oxetanylmethyl)ether, tetrabromophenyl (3-ethyl-3-oxetanylmethyl)ether, 2-tetrabromophenoxyethyl (3-ethyl-3-oxetanylmethyl)ether, tribromophenyl (3-ethyl-3-oxetanylmethyl)ether, 2-tribromophenoxyethyl (3-ethyl-3-oxetanylmethyl)ether, 2-hydroxyethyl (3-ethyl-3-oxetanylmethyl)ether, 2-hydroxypropyl (3-ethyl-3-oxetanylmethyl) ether, butoxyethyl (3-ethyl-3-oxetanylmethyl)ether, pentachlorophenyl (3-ethyl-3-oxetanylmethyl)ether, pentabromophenyl (3-ethyl-3-oxetanylmethyl)ether, bornyl (3-ethyl-3-oxetanylmethyl)ether, 3,7-bis(3-oxetanyl)-5-oxanonane, 3,3'-[1,3-(2-methylenyl)propanediil his (oxymethylene)]bis-(3-ethyloxetane), 1,4-bis [(3-ethyl-3-oxetanylmethoxy)methyl]benzene, 1,2-bis[(3-ethyl-3-oxetanylmethoxy)methyl]ethane, 1,3-bis [(3-ethyl-3-oxetanylmethoxy)methyl]propane, ethylene glycol his (3-ethyl-3-oxetanylmethyl)ether, dicyclopentenyl his (3-ethyl-3-oxetanylmethyl)ether, triethyleneglycol his (3-ethyl-3-oxetanylmethyl)ether, tetraethyleneglycol his (3-ethyl-3-oxetanylmethyl)ether, tricyclodecanediildimethylene (3-ethyl-3-oxetanylmethyl)ether, trimethylolpropane tris (3-ethyl-3-oxetanylmethyl)ether, 1,4-bis (3-ethyl-3-oxetanylmethoxy)butane, 1,6-bis (3-ethyl-3-oxetanylmethoxy)hexane, pentaerythritol tris (3-ethyl-3-oxetanylmethyl)ether, pentaerythritol tetrakis (3-ethyl-3-oxetanylmethyl)ether, polyethyleneglycol his (3-ethyl-3-oxetanylmethyl)ether, dipentaerythritol hexakis (3-ethyl-3-oxetanylmethyl)ether, dipentaerythritol pentakis (3-ethyl-3-oxetanylmethyl)ether, dipentaerythritol tetrakis (3-ethyl-3-oxetanylmethyl)ether, a caprolactone-modified dipentaerythritol hexakis (3-ethyl-3-oxetanylmethyl)ether, a caprolactone-modified dipentaerythritol pentakis (3-ethyl-3-oxetanylmethyl)ether, ditrimethylolpropane tetrakis (3-ethyl-3-oxetanylmethyl)ether, an EO modified bisphenol A his (3-ethyl-3-oxetanylmethyl)ether, a PO modified bisphenol A his (3-ethyl-3-oxetanylmethyl)ether, an EO modified hydrogenated bisphenol A his (3-ethyl-3-oxetanylmethyl)ether, a PO modified hydrogenated bisphenol A bis (3-ethyl-3-oxetanylmethyl)ether, an EO modified bisphenol F (3-ethyl-3-oxetanylmethyl)ether, oxetane (meth)acrylate, 3-ethyl-3-hydroxymethyloxetane, 1,4-bis{[(3-ethyl-3-oxetanyl)methoxy]methyl}benzene, 3-ethyl-3-(phenoxymethyl)oxetane, di[1-ethyl(3-oxetanyl)]methyl ether, 3-ethyl-3-(2-ethylhexyloxymethyl)oxetane, 3-ethyl-3-{[3-(triethoxysilyl)propoxy]methyl}oxetane, oxetanylsilsesquioxane, and phenolnovolac oxetane.

Examples of other light-curable compound of a system of cationic polymerization include the following: an oxolane compound, such as tetrahydrofuran and 2,3-dimethyltetrahydrofuran; a cyclic acetal compound, such as trioxane, 1,3-dioxolane, and 1,3,6-trioxanecyclooctane: a cyclic lactone compound, such as β-propiolactone and s-caprolactone: thiirane compound, such as ethylene sulfide and thioepichlorohydrin; a thiethane compound, such as 1,3-propyne sulfide and 3,3-dimethylthiethane; a cyclic thioether compound, such as a tetrahydrothiophene derivative; and a spiro ortho ester compound obtained by reacting an epoxy compound with lactone.

The above-mentioned light-curable compounds of systems of cationic polymerization may be used alone or as a mixture of two or more types.

For a photopolymerization initiator of a system of cationic polymerization, a photoacid-generating agent which is generally used in light cationic polymerization may be used. An example of the photoacid-generating agent includes a double salt that is an onium salt generating a Lewis acid or a derivative of the double salt.

An example of an onium salt includes a salt consisting of a cation which is obtained by linking an atom or an atomic group selected from the group consisting of S, N, Se, Te, P, As, Sb, Bi, O, I, Br, Cl, F, and N=N with (an) organic group(s), at least one of which contains an aromatic ring, and an anion which is any one of tetrafluoroborate ($BF_4^-$), tetrakis (pentafluorophenyl) borate ($B(C_6F_5)_4^-$), hexafluorophosphate ($PF_6^-$), hexafluoroantimonate ($SbF_6^-$), hexafluoroarsenate ($AsF_6^-$), and hexachloroantimonate ($SbCl_6^-$).

For a light cation polymerization initiator, a sulfonated compound which generates a sulfonic acid, a halide which generates a hydrogen halide with light, and also an iron-allene complex may be used.

<Recording Medium>

Recording media on which images are formed with the ink according to the present invention are not particularly limited and are, for example, paper, thread, fiber, fabric, leather, metal, plastic, glass, wood, and ceramics.

Even when the ink according to the present invention is used for forming an image on an ink-nonabsorbable recording medium, it is possible to obtain a print image having significantly improved image quality.

Examples of the ink nonabsorbable recording medium include plastic, glass, metal, and ceramics, and the effect of the ink according to the present invention may be readily achieved when images are formed on ink-repellent plastics.

The plastic is not particularly limited; examples thereof include a polyvinyl chloride, polyethylene, ionomer resin, polyvinyliden chloride, polypropylene, polyvinyl alcohol, polycarbonate, polyester, polyacrylonitrile, acrylic resin, ABS, polyacetal, polystyrene, cellophane, and copolymer with ethylene.

It is possible to form an image on three-dimensionally molded materials of the above materials. However, when any one of the above materials is made into a film by melt extrusion, solution casting, or calendaring and when images are to be formed on a surface thereof, it becomes possible to precisely position a head to a recording medium, which results in achievement of excellent image quality according to a printing speed.

However, since a local surface energy of these plastics greatly varies, the dot diameter after ink landing may vary due to ink-repellency of the plastic. However, when the ink of the present invention, which has an excellent wettability to a recording medium, is used, the dot diameter of the ink does not greatly vary even on any one of these plastics to provide excellent image quality.

<Ultraviolet Curable Inkjet Recording Apparatus>

The ink according to the present invention can be used in one of a serial type inkjet recording apparatus and a line type inkjet recording apparatus, where in the former apparatus a head is displaced with respect to a recording medium which moves intermittently according to the head width and thereby the ink is ejected to the recording medium, and in the latter apparatus an ink is ejected onto a recording medium from a head which is held on a constant position.

Hereinafter, an example of a line type inkjet recording apparatus in which the ink of the present invention can be used will be described with reference to FIG. 1.

A recording medium sheet 10 is separated one by one by a separation roller 11 from a paper supply section 2, pressed to and sucked on, by a paper supply roller 12, a feeding belt 1 stretched over a matched pair of feeding rollers 14, and fed by the feeding belt 1. A sucking platen 15 is depressurized with a sucking fan 16 to suck the recording medium sheet on a surface of the feeding belt which has a number of pores. On the recording medium sheet, which is sucked on the feeding belt and fed, inkjet heads 5-8 in a carriage 3 form multi-color images, which are exposed to ultraviolet light from an ultraviolet lamp 17 in an exposing unit 4 to be cured and fixed. The printed matter is discharged via a paper discharge roller 13 to a stacker 9.

The inkjet recording apparatus may be equipped with a light reflector 18 for reflecting light from the ultraviolet lamp to a recording medium sheet surface, or an exhaust system in which air over the recording medium sheet, which is heated by the ultraviolet lamp and by ozone gas produced through effects of ultraviolet light, is sucked by a sucking fan 19 for cooling and thus sucked air is discharged while toxic gas therein being adsorbed by an exhaust filter 20.

<Inkjet Head>

Examples of the inkjet head include a recording head using a piezoelectric element, a recording head using a heater element, and a recording head using forces of electrostatic attraction. Among these, the recording head using a piezoelectric element is preferred in terms of ejecting ability and freedom of ink composition.

Nozzle surfaces of such inkjet heads are desirably treated so as to have ink-repellency. Methods for treating nozzle surfaces to provide ink-repellency may include vapor deposition of an ink-repellent material, application of an ink-repellent material, and plating of an ink-repellent material, and may be selected depending on the properties of the ink-repellent material and the constituent material of the nozzle surfaces.

Examples of a material having ink-repellency include a fluorine compound and a silicone resin. Among these, a PTFE treatable by eutectoid plating and a silane compound having a vapor depositable perfluoroalkyl are desired in terms of the strength of an ink-repellent layer and ink-repellency.

<Ink Supply Device>

An ink supply device for supplying the ink to an inkjet head is composed of an ink tank, a pump for sending liquid, a tube for sending liquid, packing, a heater, and a thermal insulation member. It is necessary that the surfaces of these members making contact with the ink have adequate resistance to the ink.

Since the ink hardens in a supply line when ultraviolet light is not blocked from reaching the ink, it is necessary that the ink supply device has light blocking ability. Also it is necessary that from the ink supply device a substance that causes curing reaction, such as metal ion, be not eluted into the ink. Further, it is also necessary to prevent contamination with a substance that inhibits curing. Examples of the substance that inhibits curing include oxygen gas for an ink of a system of radical polymerization and water for an ink of a system of cationic polymerization. Therefore, in order to prevent contamination by such substance, it is necessary to use members having permeability of air/moisture at a certain level or less.

Available ranges of physical properties of these members may be discretionally set depending on conditions of user's use of the ink. When the ink is used under different conditions from the conditions of user's use of the ink, however, failures which markedly impair reliability of the ink, such as ink clogging, may occur.

<Ultraviolet Curing Lamp>

The duration of time from the ink ejection to the ultraviolet curing/fixation of the ink is not particularly limited; however, is preferably one second or less for efficient use of the ink of the present invention. Since as the duration of time from the ink ejection to the ultraviolet curing of the ink becomes longer a resulting image formed on a recording medium is blurred by ink exudation or discolored (unevenly colored), it is desirable to cure the ink as soon as possible for forming an excellent image with an ultraviolet curable ink.

Examples of a light irradiation device for curing image-forming ink droplets include ultraviolet (UV) irradiation lamp and electron beam generator. The UV irradiation lamp, which may deform a recording medium by its heat, is desirably equipped with a cooling unit, such as cold mirror, cold filter, and work cooling unit.

Examples of type of the lamp include electrode lamps or electrodeless lamps using high pressure mercury vapor, ultra-high pressure mercury vapor, or metal halide vapor, etc., and UV-LEDs. The lamp which can be used is not particularly limited, so long as it is effective in curing the ink, and a combination of the lamps having different wavelengths or two or more lamps belonging to the same lamp product may be used. An example of these lamps includes a commercially available lamp system, manufactured by Fusion UV Systems, Inc., containing an "H" lamp, "D" lamp, and "V" lamp.

Furthermore, it is also effective to use a hot air drying device equipped in parallel for speeding up image formation or to deposit an oxygen impermeable membrane, such as a polyvinyl alcohol membrane, over an image which is exposed to ultraviolet light through the membrane with the curing efficiency thereof being enhanced.

The accumulated amount of light received by the surface of a recording medium is inversely related to the speed at which the recording medium is conveyed under the irradiated region by the light source. The accumulated amount of light for the wavelength range of UVA (320 nm to 390 nm) is preferably 200 mJ/cm$^2$ to 1,500 mJ/cm$^2$, more preferably 200 mJ/cm$^2$ to 1,000 mJ/cm$^2$, and particularly preferably 200 mJ/cm$^2$ to 800 mJ/cm$^2$.

When the accumulated amount of light for the UVA wavelength range is less than 200 mJ/cm², an image having a thick ink membrane thickness of more than 30 μm may often remain uncured. When the accumulated amount of light is more than 1,500 mJ/cm², it is unsuitable for high speed recording and heat is generated to deform the recording medium on which an image is formed.

The effective ultraviolet light intensity for the UVA wavelength range is 3,000 mW/cm² to 5,000 mW/cm², preferably 3,000 mW/cm² to 4,800 mW/cm², and more preferably 3,200 mW/cm² to 4,700 mW/cm². When an ultraviolet light intensity for the UVA wavelength range is less than 3,000 mW/cm², the ink cures inadequately. When the ultraviolet light intensity for the UVA wavelength range is more than 5,000 mW/cm², the cost of an image forming apparatus using the ultraviolet lamp often becomes expensive as elaboration of the apparatus and of the ink formulation costs high.

EXAMPLES

Hereinafter, the present invention is further specifically described by presenting Examples and Comparative Examples, however, the scope of the present invention is not limited to these Examples. Note that in the Examples and the Comparative Examples, "part(s)" and "%" means "part(s) by mass" and "% by mass", respectively.

Examples 1 to 10 and Comparative Examples 1 to 5

Pretreatment of Pigment

Into a pressure type kneader, 250 parts of each pigment powder specified in Table 1, 2,500 parts of sodium chloride, and 160 parts of polyethylene glycol 300 were put and kneaded for three hours.

Subsequently, this mixture was put in 3 L of warm water, stirred by a homomixer at about 80° C. for about one hour to obtain slurry, then the slurry was filtered and washed with water with the filtration and washing treatment being repeated five times, and the resulting slurry was spray-dried to prepare a pretreated pigment.
<Preparation of Ink>

Each of the above-mentioned pretreated pigments, each of dispersants, and each of light-curable compounds were put in a sand mill as specified in Table 1 and dispersed thereby for 4 hr. Subsequently, each of photopolymerization initiators and each of fluorine surfactants were added to the resulting dispersion as specified in Table 1 and gently mixed, so as not to incorporate air bubbles, till the photopolymerization initiator was dissolved, to prepare an ink stock solution.

This ink stock solution was filtered under pressure through a membrane filter to prepare an inkjet recording ink to be used in the evaluation tests. The amount of each component incorporated in the inkjet recording ink is indicated in Table 1.

The chemical structure of each fluorine surfactant indicated in Table 1 is as follows.

(1) The basic chemical structure of POLYFOX PF3305, PF3510, and PF3320 is indicated by (6).

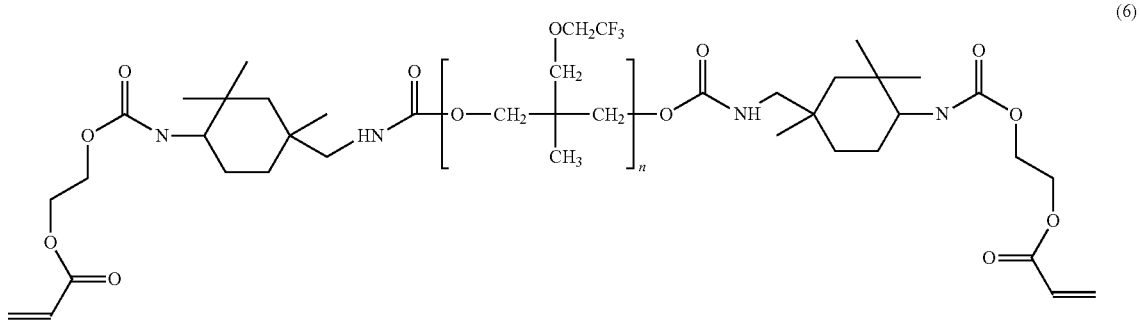

(6)

where n is 5 for PF3305, 10 for PF3510, and 20 for PF3320.

(2) The chemical structure of POLYFOX PF656 is indicated by (7).

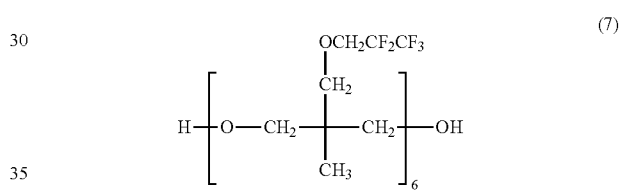

(7)

(3) MEGAFACE F-178K is an oligomer containing a perfluoroalkyl group/lipophilic group diluted by 30% in mineral spirits, and its precise chemical structure is unknown. However, as far as it is known, it is not such an oligomer having a chemical structure with repeating chains of oxetane origin as POLYFOX PF656.

(4) Compound A is a fluorine surfactant provided with a group capable of initiating cationic polymerization, and has chemical structure indicated by (8). The fluorine surfactant was provided with the group capable of initiating cationic polymerization by following the procedure in accordance with JP-B No. 3882486.

Into a 500-mL glass round-bottom flask equipped with a stirrer, a dropping funnel, a thermometer, a diversion tube, and a condenser, 40.39 g (0.3 mol) of 3-chloromethyl-3-ethyloxetane and 142.32 g (0.1 mol) of POLYFOX PF656 were put, and, while stirring the mixture, 12.27 g of an aqueous solution containing 48% by mass KOH (corresponds to 0.105 mol of KOH) was dripped into the mixture for 30 min. After the drip of the aqueous solution containing KOH had been completed, the resulting mixture was heated to 120° C. While the pressure in the system was controlled at about 600 mmHg with an aspirator, water in the resulting mixture was distilled away by azeotropic distillation for 12 hr, during which time the resulting mixture was reacted. Subsequently, precipitated salts in the resulting mixture were dissolved by addition of 50 mL pure water so that the resulting diluted mixture was separated into aqueous and organic phases, and then, the organic phase was collected. Further, a cleaning procedure in which 50 mL pure water was added to the collected organic phase, the resulting dilution being fully mixed and separated into aqueous and organic phases, with the organic phase being collected for the next repetition of the procedure, was repeated three times to prepare 152 g of a cleaned organic phase.

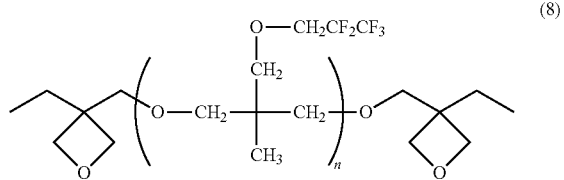

(8)

where n is 6.

mPa·s; ink ejection speed: 3 kHz; and feeding speed of a recording medium: 20 m/min. Subsequently, the images were cured by exposing them to ultraviolet light, which was irradiated from a metal halide lamp, at an accumulated amount of light of 1,500 mJ/cm².

For a recording medium, a polyethylene terephthalate (PET) film having a film thickness of 125 μm without surface treatment was used.

In order to select a heating condition at the time of printing, the temperature at which the ink viscosity becomes 10.0±0.5 mPa·s was determined by means of an E type viscometer capable of controlling temperatures.

<Curability>

Solid images of an average membrane thickness of 10 μm were printed on recording media with the inkjet recording apparatus. The central area of the printed image was rubbed

TABLE 1

|  |  | Example |  |  |  |  |  |  |  |  |  | Comparative Example |  |  |  |  |
|---|---|---|---|---|---|---|---|---|---|---|---|---|---|---|---|---|
|  |  | 1 | 2 | 3 | 4 | 5 | 6 | 7 | 8 | 9 | 10 | 1 | 2 | 3 | 4 | 5 |
| Pigment | Toner Cyan BG (PB 15:3)[a] | 5 | 5 | 5 | 5 | 5 |  |  |  | 5 | 5 | 5 | 5 | 5 | 5 | 5 |
|  | Toner Magenta E02 (PR122)[a] |  |  |  |  |  | 5 |  |  |  |  |  |  |  |  |  |
|  | Toner Yellow HG (PY180)[a] |  |  |  |  |  |  | 5 |  |  |  |  |  |  |  |  |
|  | MA77[b] |  |  |  |  |  |  |  | 5 |  |  |  |  |  |  |  |
| Dispersant | SOLSPERSE 5000[c] | 1.5 | 1.5 | 1.5 | 1.5 | 1.5 |  |  |  | 1.5 | 1.5 | 1.5 | 1.5 | 1.5 | 1.5 | 1.5 |
|  | SOLSPERSE 32000[c] | 3 | 3 | 3 | 3 | 3 | 4 | 4 | 4 | 3 | 3 | 3 | 3 | 3 | 3 | 3 |
| Light-curable compound | 2-Phenoxyethyl acrylate (V#192)[d] | 51 | 51 | 51 | 46 | 51 | 51 | 51 | 51 |  | 30 | 50 | 50 | 50 | 51 |  |
|  | Tripropyleneglycol diacrylte (V#310HP)[d] | 30 | 30 | 30 | 30 | 30 | 30 | 30 | 30 |  | 5 | 30 | 30 | 30 | 30 |  |
|  | 3-Ethyl-3-hydroxymethyloxetane (OXA)[e] |  |  |  |  |  |  |  |  | 64 | 17 |  |  |  |  | 64 |
|  | 3-Methyl-3-oxetanyl methacrylate (OXE-30)[d] |  |  |  |  |  |  |  |  |  | 25 |  |  |  |  |  |
|  | Epoxidized soybean oil (KAPOX S-6)[f] |  |  |  |  |  |  |  |  | 20 | 5 |  |  |  |  | 20 |
| Photo-polymerization initiator | IRGACURE 907[g] | 6.5 | 6.5 | 6.5 | 6.5 | 6.5 | 6.5 | 6.5 | 6.5 |  | 3.3 | 6.5 | 6.5 | 6.5 | 6.5 |  |
|  | Isopropylthioxanthone[h] | 3.5 | 3.5 | 3.5 | 3.5 | 3.5 | 3.5 | 3.5 | 3.5 |  | 1.8 | 3.5 | 3.5 | 3.5 | 3.5 |  |
|  | CS5102[i] |  |  |  |  |  |  |  |  | 5 | 2.5 |  |  |  |  | 5 |
|  | C17001[i] |  |  |  |  |  |  |  |  | 1 | 0.5 |  |  |  |  | 1 |
| Fluorine surfactant | POLYFOX PF3305[j] | 0.1 |  |  |  |  |  |  |  |  |  |  |  |  |  |  |
|  | POLYFOX PF3510[j] |  | 0.1 |  |  |  |  |  |  |  |  |  |  |  |  |  |
|  | POLYFOX PF3320[j] |  |  | 0.01 | 5 | 0.1 | 0.1 | 0.1 | 0.1 |  | 0.05 |  |  |  |  |  |
|  | Compound A |  |  |  |  |  |  |  |  | 0.1 | 0.05 |  |  |  |  |  |
|  | MEGAFACE F-178K[k] |  |  |  |  |  |  |  |  |  |  | 0.4 |  |  |  |  |
|  | POLYFOX PF656[j] |  |  |  |  |  |  |  |  |  |  |  | 0.1 |  |  | 0.1 |
| Fluorine monomer | Octafluoropentyl methacrylate (V-8FM)[d] |  |  |  |  |  |  |  |  |  |  |  |  | 0.1 |  |  |

[a],[b],[c],[d],[e],[f],[g],[h],[i],[j], and [k]Manufactured by

[a]Clariant(Japan) K.K.,
[b]Mitsubishi Chemical Corporation,
[c]Avecia Inkjet,
[d]OSAKA ORGANIC CHEMICAL INDUSTRY LTD.,
[e]TOAGOSEI CO., LTD.,
[f]KAO Corporation,
[g]Ciba Japan K.K.,
[h]Tokyo Chemical Industry CO., LTD.,
[i]NIPPON SODA CO., LTD.,
[j]OMNOVA Solution Inc., and
[k]DIC Corporation, respectively.

<Printing Method>

The inkjet recording apparatus of FIG. 1 using a piezoelectric inkjet head capable of controlling ink temperatures from the ink supply system to the head was charged with each inkjet recording ink of Examples and Comparative Examples, and images were recorded under the following conditions: temperature: controlled such that the ink viscosity became 10 with a finger through a cotton cloth, and the degree to which portions of the printed image peeled off from the recording medium and was transferred to the cotton cloth was visually evaluated. Evaluation criteria were as follows:

A: No portion of the image peeled off or was transferred to the cotton cloth.

B: The image surface was scratched and some portion of the image was transferred to the cotton cloth.

C: The image was damaged and a large portion of the image was transferred to the cotton cloth.

<Evaluation of Printing>

Copies of a Chinese character "todoroki", which means "boom", were printed in 6-point, MS gothic letters on recording media with the inkjet recording apparatus, and broken letter configuration or jaggy of the letters due to ink-repellency of the recording media was visually evaluated with the aid of a microscope. Evaluation criteria were as follows:

A: Letters were clearly readable.

B: Slightly poor resolution/jaggy of letters was seen, however, letters were still readable.

C: Letters were unreadable.

<Evaluation of Adhesion>

Solid images of an average membrane thickness of 10 μm were printed on recording media with the inkjet recording apparatus. The printed solid patterns on recording media were scratched in a pattern of lattice having a pitch of 1 mm and tested for their adhesion on the recording media using a Scotch tape in accordance with JIS K5600-5-6.

The evaluation was performed twice; one was carried out immediately after printing and the other was after a period in which bleeding of uncured surfactant molecules in the ink had been accelerated by leaving the recording media with the printed images for two weeks at 50° C. in a thermostatic chamber. For the evaluation criteria, classification of test results indicated in Table 1 in 8.3 of JIS K5600-5-6 (1999) was adopted, that is A: Classification 0

B: Classification 1

C: Other than A or B

<Evaluation of Glossiness>

Solid images of an average membrane thickness of 10 μm were printed on recording media with the inkjet recording apparatus, and the degree of glossiness of the solid images was visually evaluated. The evaluation was performed twice; one was carried out immediately after printing and the other was after a period in which bleeding of uncured surfactant molecules in the ink had been accelerated by leaving the recording media with the printed images for two weeks at 50° C. in a thermostatic chamber. Evaluation criteria were as follows:

A: Solid areas were even and glossy.

B: Solid areas were dull, or their surfaces were uneven and less glossy.

<Ejection Stability>

Ink ejection from a head was inspected using an ink particle formation observing device after the ink had been continuously ejected for 6 hr at an ejection speed of 10 kHz, and occurrences of nozzle malfunction and ejection deviation from the normal ink ejection direction were counted for evaluating ejection stability. Evaluation criteria were as follows:

A: Nozzle malfunction or ejection deviation did not occur.

B: Nozzle malfunction did not occur; however, ejection deviations occurred in less than 5% of the cases inspected.

C: Nozzle malfunction occurred in some cases, and ejection deviations occurred in 5% or more of the cases inspected.

The results of the above-mentioned evaluation tests are summarized in Table 2.

TABLE 2

|  |  | Example | | | | | | | | | | Comp. Example | | | | |
| --- | --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 1 | 2 | 3 | 4 | 5 |
| Curability |  | A | A | A | A | A | A | A | A | A | A | A | A | A | A | A |
| Printing |  | A | A | B | A | A | A | A | A | A | A | A | A | C | C | A |
| Adhesion | After printing | A | A | B | A | A | A | A | A | A | A | A | A | B | C | C |
|  | After bleeding acc. | A | A | B | A | A | A | A | A | A | A | C | C | C | C | C |
| Glossiness | After printing | A | A | A | A | A | A | A | A | A | A | A | B | B | B | A |
|  | After bleeding acc. | A | A | A | A | A | A | A | A | A | B | B | B | B | B | B |
| Ejection stability |  | A | A | A | B | A | A | A | A | A | A | B | A | B | A | A |

As can be seen in Table 2, all the inks of Examples 1 to 10 could achieve all of excellent curability of the inks, excellent printed image quality, excellent adhesion, excellent glossiness of the images, and excellent ejection stability.

As to the printed image quality, it is considered that the ink containing the fluorine surfactant of the present invention could wet even a hydrophobic PET film widely enough to achieve the predetermined image quality criterion.

As to the adhesion of inks, adhesion of inks of Examples and Comparative Examples was acceptable immediately after printing, however, after bleeding of surfactants had been accelerated by heating, adhesion degraded in the inks whose surfactants were not polymerizable on exposure to ultraviolet light.

Further as to the glossiness of images, inks which had inadequate wettability for forming uniform coat membranes could not achieve acceptable glossiness, and produced dull images due to bleeding of surfactants after bleeding of surfactants had been accelerated, though produced favorable glossiness immediately after printing.

As to the ejection stability, it is considered that inks using the oligomeric fluorine surfactants of the present invention reduce the amount of foaming to reduce incorporation of air bubbles into heads, leading to stabilization of ejection.

As described above, when an inkjet recording ink of the present invention is used for printing, it becomes possible to achieve excellent printed image quality even on a recording medium having poor ink fixability, prevent bleeding by polymerizing the fluorine surfactant through exposure to ultraviolet light, and maintain excellent adhesion or glossiness of the coated membrane.

The invention claimed is:

1. An ultraviolet curable inkjet recording ink comprising:
a colorant;
a light-curable compound;
a photopolymerization initiator; and a fluorine surfactant represented by one of the following structural formulae (1) and (2):

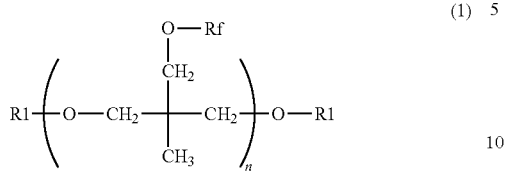

where Rf in the formula (1) is selected from the group consisting of $CH_2CF_3$ and $CH_2CF_2CF_3$, n represents a value of 5 to 20, at least one of the two R1s represents a functional group curable by an ultraviolet curing reaction, and one of the two R1s in the structural formula (1) may be a hydrogen atom, and

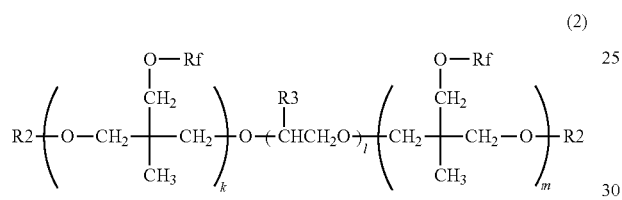

where Rf in the formula (2) is selected from the group consisting of $CH_2CF_3$ and $CH_2CF_2CF_3$, l represents a value of 1 to 20, k and m each represent a value of 1 to 8, at least one of the two R2s represents a functional group curable by an ultraviolet curing reaction, one of the two R2s in the structural formula (2) may be a hydrogen atom, and R3 is selected from the group consisting of hydrogen atom and a methyl group.

2. The ultraviolet curable inkjet recording ink according to claim 1, wherein at least one of the two functional groups R1 is selected from the group consisting of a vinyl group, an isopropenyl group, an allyl group, a methallyl group, an acryloyl group, a methacryloyl group, a propioloyl group, a maleoyl group, an epoxy group, and an oxetanyl group.

3. The ultraviolet curable inkjet recording ink according to claim 2, wherein at least one of the two functional groups R1 is represented by the following structural formula (3):

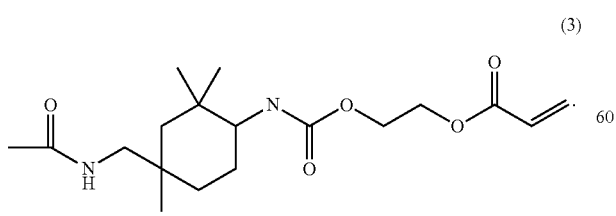

4. The ultraviolet curable inkjet recording ink according to claim 2, wherein at least one of the two functional groups R1 is represented by one of the following structural formulae (4) and (5):

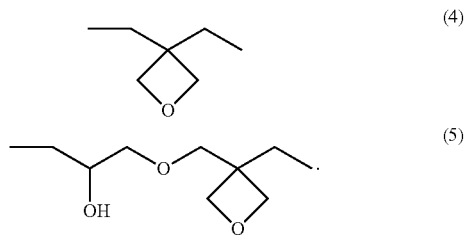

5. A color image forming apparatus, comprising:
an ultraviolet curable inkjet recording ink;
the ultraviolet curable inkjet recording ink comprises
a colorant,
a light-curable compound,
a photopolymerization initiator, and
a fluorine surfactant represented by one of the following structural formulae (1) and (2):

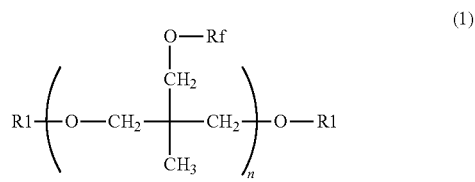

where Rf in the formula (1) is selected from the group consisting of $CH_2CF_3$ and $CH_2CF_2CF_3$, n represents a value of 5 to 20, at least one of the two R1s represents a functional group curable by an ultraviolet curing reaction, and one of the two R1s in the structural formula (1) may be a hydrogen atom, and

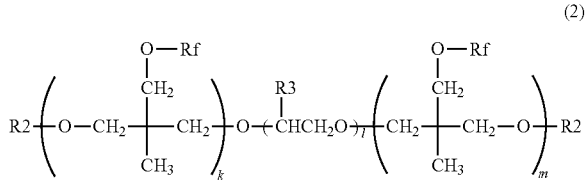

where Rf in the formula (2) is selected from the group consisting of $CH_2CF_3$ and $CH_2CF_2CF_3$, l represents a value of 1 to 20, k and m each represent a value of 1 to 8, at least one of the two R2s represents a functional group curable by an ultraviolet curing reaction, one of the two R2s in the structural formula (2) may be a hydrogen atom, and R3 is selected from the group consisting of a hydrogen atom and a methyl group.

6. The ultraviolet curable inkjet recording ink according to claim 1, wherein at least one of the two functional groups R2 is selected from the group consisting of a vinyl group, an isopropenyl group, an allyl group, a methallyl group, an acryloyl group, a methacryloyl group, a propioloyl group, a maleoyl group, an epoxy group and an oxetanyl group.

7. The ultraviolet curable inkjet recording ink according to claim 6 wherein at least one of the two functional groups R2 is represented by the following structural formula (3):
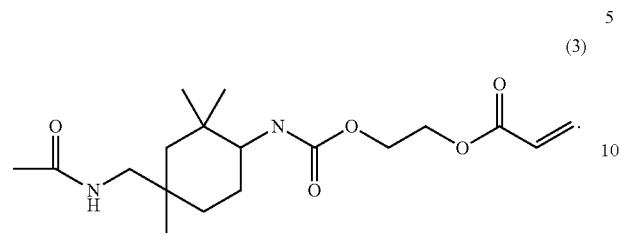
(3)
8. The ultraviolet curable inkjet recording ink according to claim 6, wherein at least one of the two functional groups R2 is a group represented by one of the following structural formulae (4) and (5):
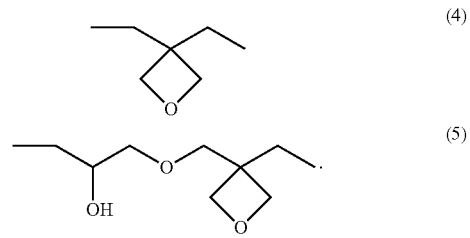
(4)
(5)
* * * * *